United States Patent [19]
Lippens

[11] Patent Number: 5,108,174
[45] Date of Patent: Apr. 28, 1992

[54] METHOD AND DEVICE FOR DETERMINING LENS CHARACTERISTICS INCLUDING ITS POWER

[75] Inventor: Xavier Lippens, Paris, France

[73] Assignee: Essilor International Cie Generale d'Optique, Creteil Cedex, France

[21] Appl. No.: 601,434

[22] Filed: Oct. 23, 1990

[30] Foreign Application Priority Data

Nov. 10, 1989 [FR] France ............... 89 14782

[51] Int. Cl.⁵ .................................. G01B 9/00
[52] U.S. Cl. ............................. 356/124; 356/125; 356/127
[58] Field of Search ............... 356/124, 125, 126, 127

[56] References Cited

U.S. PATENT DOCUMENTS 3,880,525  4/1975  Johnson ..................... 356/127
4,275,964  6/1981  Vassiliadis ................. 356/125
4,609,287  9/1986  Kohayakawa ............. 356/124

FOREIGN PATENT DOCUMENTS 2270575  12/1975  France .
2501372   9/1982  France .
1420428   8/1988  U.S.S.R. ..................... 350/124
2105029   3/1983  United Kingdom .

Primary Examiner—F. L. Evans
Attorney, Agent, or Firm—Longacre & White

[57] ABSTRACT

To determine the focal power of an ophthalmic lens, a plurality of light rays are passed through the lens and a photosensitive position sensor is disposed on the exit side of the lens to measure the coordinates of the points at which the light beams impinge on an analysis plane perpendicular to the lens axis. The light rays comprise three light rays on a circle and a light ray on the system axis.

10 Claims, 2 Drawing Sheets

METHOD AND DEVICE FOR DETERMINING LENS CHARACTERISTICS INCLUDING ITS POWER

BACKGROUND OF THE INVENTION

1. Field of the invention

The present invention is generally concerned with determining at least some of the optical characteristics of a lens.

It is more particularly, but not exclusively, directed to determining the focal power of an ophthalmic lens.

2. Description of the prior art

The present invention is even more particularly directed to the case in which the focal power of an ophthalmic lens is determined using an instrument which comprises, in practice on the entry side of the lens, emission means adapted to form a plurality of light beams and, on the exit side of the lens, a photosensitive position sensor adapted to evaluate the impact of the light beam after passing through the lens in an analysis plane perpendicular to the axis of the lens.

This is the case, for example, with the instrument described in U.S. Pat. No. 4,275,964 and is also the case with at least one of those described in French patent No 2 270 575.

In U.S. Pat. No. 4,275,964 the light rays employed are distributed in a circle and at least five light rays must be used.

The processing means employed to process the signals delivered by the position sensor are therefore somewhat complex.

In French patent No 2 270 575, although the general teaching is that at least three light rays are to be used, four light rays are actually used, at the corners of a square. When, as in this instance, the light rays are individualized on the entry side of the lens, after they pass through the lens two measurements are carried out, between which the distance between the lens and the position sensor is varied.

As previously, this results in some complexity in processing the signals obtained.

The present invention is based on the novel observation that it is advantageously possible to simplify this processing by using a center light ray.

Four light rays are then sufficient to measure the power.

SUMMARY OF THE INVENTION

In one aspect, the present invention consists in a method for determining at least one characteristic of a lens in which, to determine the focal power of the lens, a plurality of light rays comprising three light rays on a circle and a light ray on the system axis are passed through said lens and a photosensitive position sensor is disposed on the exit side of said lens to measure the coordinates of the points at which said light beams impinge on an analysis plane perpendicular to the lens axis; in another aspect it consists in a device for implementing the above method.

Apart from the fact that, as mentioned already, using a center light ray makes it possible to simplify the processing of the signals obtained, this has the further advantage of making it possible to determine before each measurement the center of coordinates to be used, to center the lens to be measured appropriately by analyzing the impact of the center light ray after it has passed through the lens, and to measure directly any prism that the lens may incorporate.

It has the further advantage of lending itself to further developments enabling measurement of the optical transmission of the lens and/or its refractive index, if required.

The characteristics and advantages of the invention will emerge from the following description given by way of example only with reference to the appended diagrammatic drawings.

DETAILED DESCRIPTION OF THE INVENTION

Figure 1:
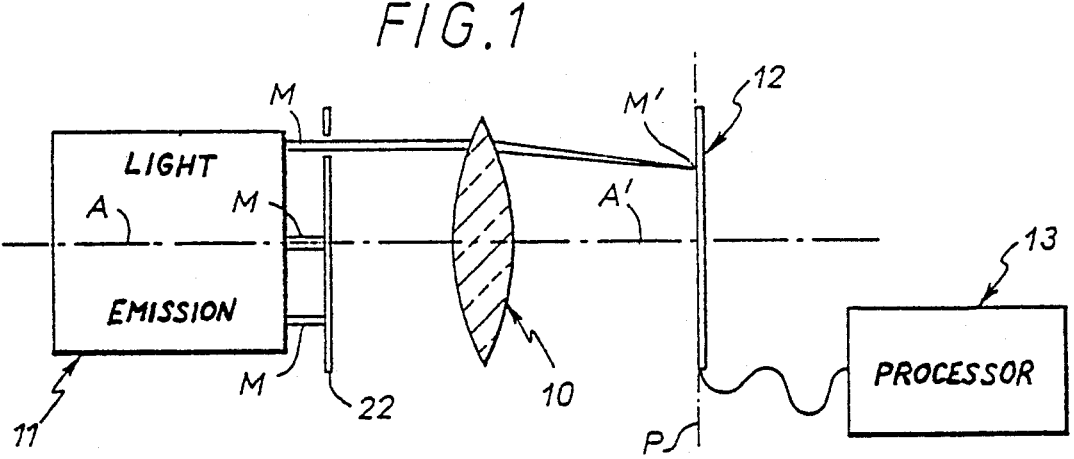
FIG. 1 is a block diagram showing a device in accordance with the invention.

Referring to FIG. 1, the overall objective is to measure the focal power of a convergent ophthalmic lens 10.

The lens could equally well be an entirely spherical ophthalmic lens or a spherical/cylindrical ophthalmic lens.

The device employed to measure the focal power of the ophthalmic lens 10 comprises on the entry side of the lens emission means 11 adapted to form a plurality of light rays M and on the exit side of the lens a position sensor 12 adapted to measure the coordinates at which the light rays impact at M' an analysis plane P perpendicular to the system axis A, the analysis plane P being defined by the front surface of the position sensor 12, for example.

Figure 2:
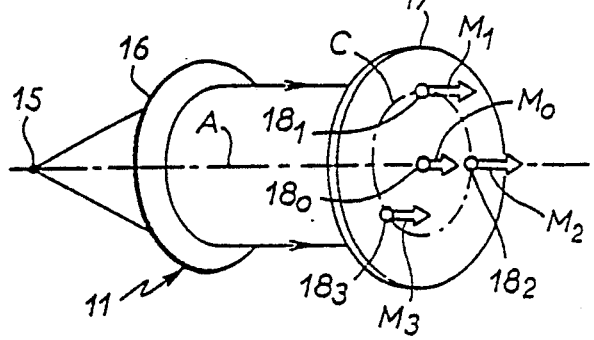
FIG. 2 is a perspective view of one embodiment of the emission means that this device incorporates.
Figure 3:
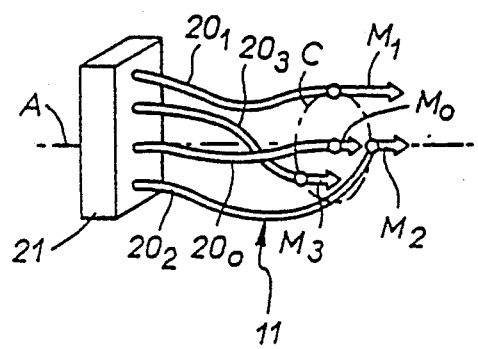
FIG. 3 is a perspective view relating to another embodiment of these emission means.
Figure 8A:
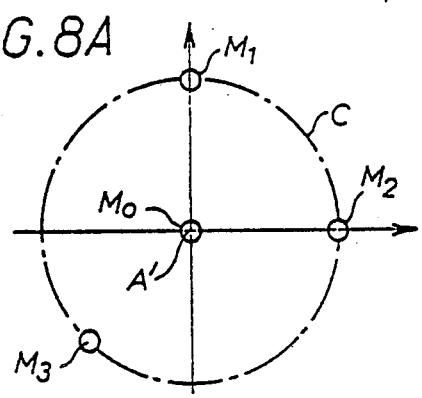
FIGS. 8A and 8B show how the invention operates.

To make it easier to visualize the invention, the light rays M have been shown relatively thick in FIGS. 1 through 3 and in the diagram of FIG. 8A.

However, it goes without saying that they may be much thinner.

Associated with the position sensor 12 is a processor unit 13 adapted to process the signals that it supplies, preferably automatically.

In accordance with the invention, and as shown in FIG. 8A, the emission means 11 are adapted to form three light rays $M_1$, $M_2$, $M_3$ lying on a common circle C, for example with the light rays $M_1$ and $M_3$ spaced by 135°, the light rays $M_2$ and $M_3$ spaced by 135° and the light rays $M_1$ and $M_2$ spaced by 90°; the emission means 11 are also adapted to form a center light ray $M_O$ on the system axis.

In the embodiment shown in FIG. 2 the emission means 11 comprise a light source 15, a collimator 16 and a mask 17 in which there are four holes 18, one for each of the light rays M.

A center hole $18_0$ forms the light ray $M_0$ and, arranged on a circle C around the center hole $18_0$, three holes $18_1$, $18_2$, $18_3$ respectively form the light rays $M_1$, $M_2$, $M_3$.

In the alternative embodiment shown in FIG. 3 the emission means 11 comprise a bundle of four optical fibers $20_0$, $20_1$, $20_2$, $20_3$ whose ends are provided with collimator optics, such as a ball or micro-lens, for example, and are arranged as required, namely, as previously stated, on a circle C to form the light rays $M_1$, $M_2$, $M_3$ and on the system axis to form the center light ray $M_0$.

In this embodiment the optical fibers $20_0$, $20_1$, $20_2$, $20_3$ have light fed into them by a common light distribution box 21.

Each could instead be provided with an individual light source such as a light-emitting diode, a laser or a lamp, for example.

As shown in FIG. 1, the device in accordance with the invention includes a mask 22 adapted to allow only one light ray M to pass through at a time, on the exit side of the emission means 11.

However, it goes without saying that if optical fibers $20_0$, $20_1$, $20_2$, $20_3$ are used the mask may be operative in the emission means 11, between the light source and the entry point into the optical fibers $20_0$, $20_1$, $20_2$, $20_3$.

It also goes without saying that an afocal reduction system may be provided on the entry side of the ophthalmic lens 10 in order to reduce the size of the portion of the lens that is analyzed.

Figure 4:
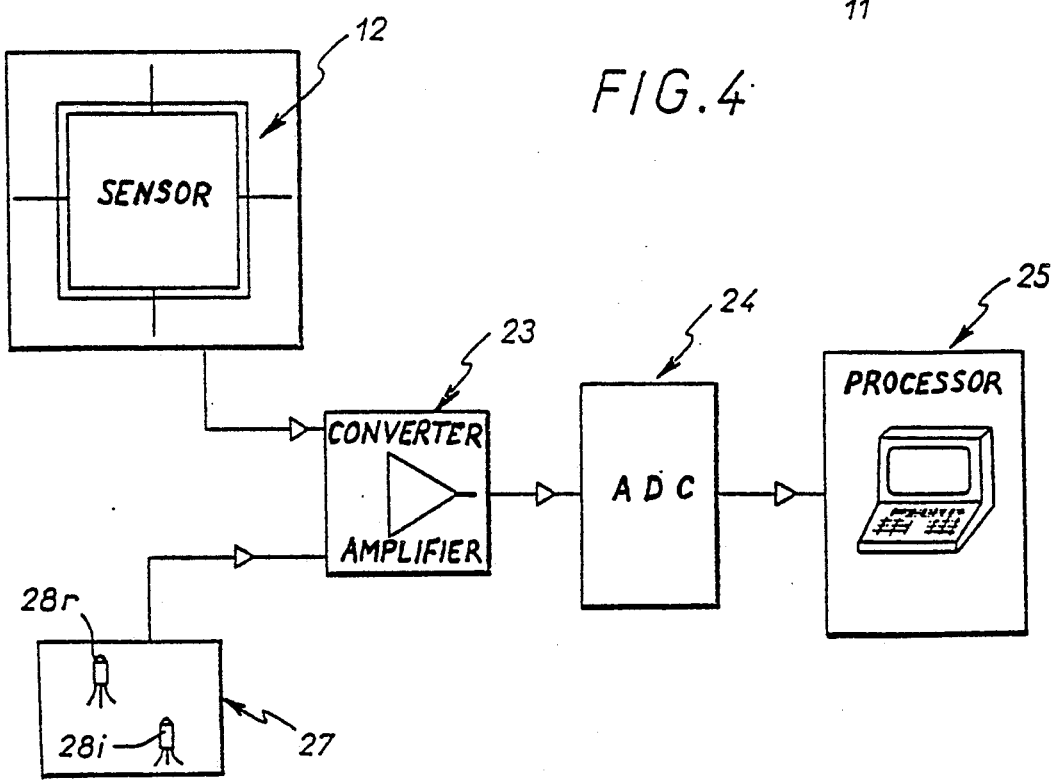
FIG. 4 is a diagram relating to the position sensor included in the device in accordance with the invention and the processor unit associated with the position sensor.

As shown in FIG. 4, the position sensor 12 is followed by a current-voltage converter and amplifier stage 23 and then by an analog-to-digital converter (ADC) 24 the signals from which are fed to a processor unit 25 in the form of a computer.

The position sensor 12 is preferably adapted to deliver a signal proportional to the intensity of the light ray impinging on it.

Figure 5:
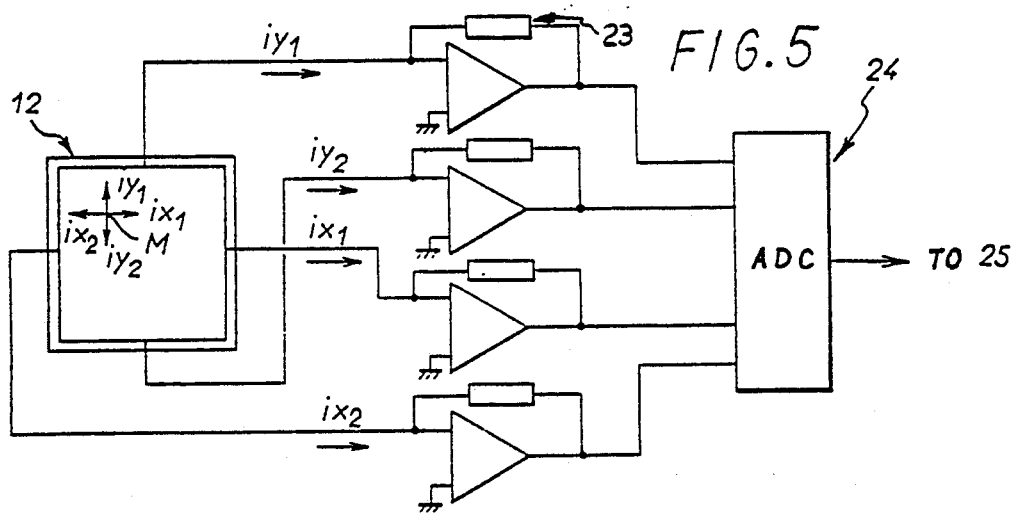
FIG. 5 is a diagram showing in more detail the position sensor and part of the associated processor unit.
Figure 6:
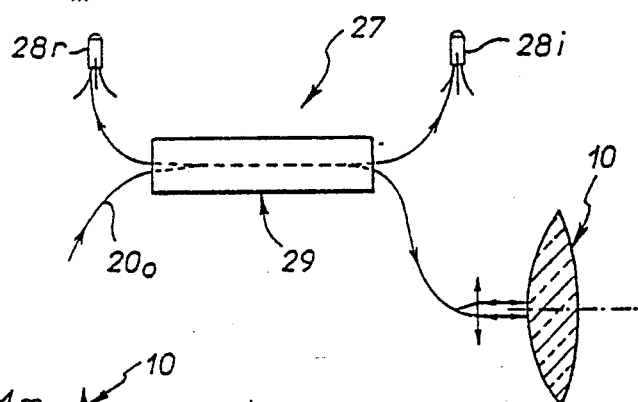
FIG. 6 is a block diagram relating to a development of the invention for measuring the refractive index of a lens.

As schematically shown in FIG. 5, it comprises, for example, a photosensitive surface which is adapted to respond to the impact of a light ray M by generating electric currents $ix_1$, $ix_2$, $iy_1$, $iy_2$ in each of four directions in the plane, two corresponding to an x axis and the other two to a y axis.

The ratios of the currents in the two opposite directions along the x axis, for example, determine the x coordinate of the point of impact of the incident light ray M. The ratios of the currents in the two opposite directions along the y axis, for example, determine the y coordinate of this point of impact.

The intensity of each current is proportional to the luminous intensity.

The current-voltage converter and amplifier stage 23 comprises as many converter-amplifier systems as there are directions in the plane.

The same applies to the ADC 24 and to the processor means 25.

To enable the refractive index of the ophthalmic lens to be determined there is preferably further associated with the center light ray $M_O$ from the emission means 11 center ray recovery means 27 adapted to recover the center ray after it has been reflected from the ophthalmic lens 10 and to route it to a detector 28r adapted to supply a signal related to its luminous intensity.

In this case the emission means 11 are preferably fiber optic emission means.

The center optical fiber $20_0$ is used in conjunction with an X coupler 29 to direct half the intensity that it carries to a detector 28i and to recover the reflected light ray and direct half of its intensity to the detector 28r.

As schematically represented in FIG. 4, the detectors 28r and 28i operate on the input side of the current-voltage converter and amplifier stage 23, in parallel with the position sensor 12.

In FIG. 1 the axis A' of the ophthalmic lens 10 whose characteristics are to be measured is coincident with the axis A of the emission mean 11 and the position sensor 12.

Figure 7:
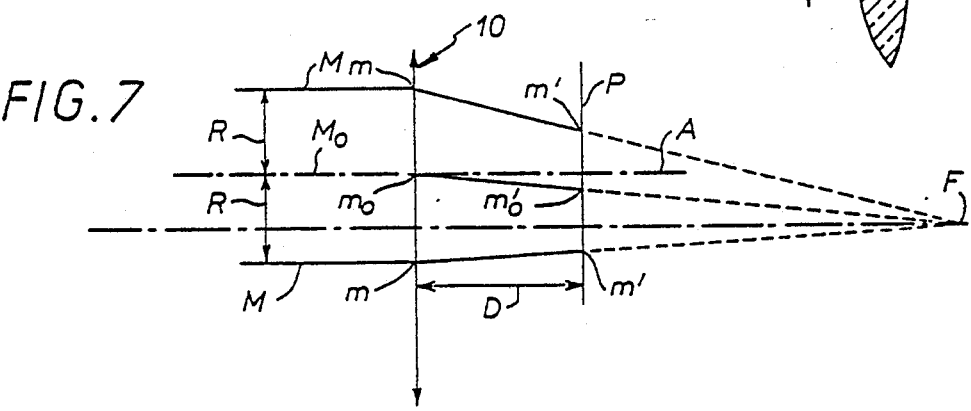
FIG. 7 is an optical diagram relating to the device in accordance with the invention.

To make the FIG. 7 optical diagram of more general application, these axes are not coincident in FIG. 7.

The center light ray $M_O$ impinges on the lens at a point $m_0$ and, after passing through the lens, is deflected towards its focus F.

It impinges on the analysis plane P at a point $m'_0$, the projection of the previously mentioned point $m_0$.

Calculation can determine the coordinates $x'_0$, $y'_0$ of the point $m'_0$ as a function of those $x_0$, $y_0$ of the point $m_0$, from the distance D between the median plane of the ophthalmic lens 10 and the analysis plane P and from the distance between the axis A' of the ophthalmic lens 10 and the system axis A.

As symmetry is conserved, the locus of the points m' which are the projections of the points m on a circle C of radius R centered on the system axis A and therefore on the point $m_0$ is a curve centered on the point $m'_0$ which is the projection of the point $m_0$.

If the ophthalmic lens 10 is a purely spherical lens this curve is a circle.

Figure 8B:
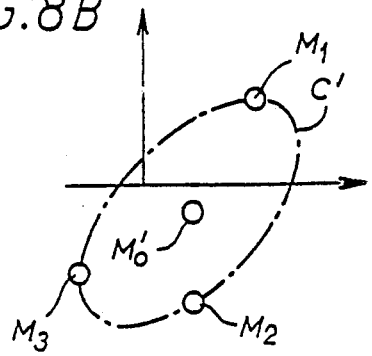

. If, as here, it is a spherical-cylindrical lens the curve is an ellipse C' as schematically represented in FIG. 8B.

The equation for the ellipse C' may be stated in the following form:

$$A[x^2 - 2x\,x'_0] + B[xy - xy'_0 - x'_0 y] + C[y^2 - 2y\,y'_0] + F = 0 \quad (I)$$

The coordinates of three points on the ellipse are known, namely the points $M'_1$, $M'_2$, $M'_3$ are the projections of the points defined by the light rays $M_1$, $M_2$, $M_3$. Also known are the coordinates of its center $M'_0$ which is the projection of the point defined by the center light ray $M_0$. By inserting these values into equation (I) above it is possible to obtain a system of three equations from which the coefficients A, B, C and F of equation (I) may be determined.

The ellipse C' is then completely defined.

Calculation shows that it is then possible to determine the focal power of the ophthalmic lens 10 from the major axis and the minor axis of this ellipse.

When, as here, the ellipse is inclined, its angle of inclination also makes it possible to determine the angle of the cylinder of the ophthalmic lens 10.

Its off-center distance also makes it possible to determine the prismatic value of the lens.

The refractive index n of the ophthalmic lens 10 is obtained from the coefficient of reflection, that is to say from the ratio Re between the intensity Ir of the reflected light beam and that Ii of the incident light beam, as measured using the detectors 28r and 28i.

$$Re = \frac{Ir}{Ii} = \left[\frac{n-1}{n+1}\right]^2$$

The optical transmission of the ophthalmic lens 10 is obtained from the ratio of the luminous fluxes measured with and without the ophthalmic lens present.

Of course, the present invention is not limited to the embodiment and the application described and shown, but encompasses any variant execution thereof.

I claim:

1. Method for determining lens characteristics, in particular the focal power, comprising the steps of: directing three light rays on a circle and a light ray along an axis through the center of the circle, towards and through a lens, photosensitively sensing the position of the light rays in an analysis plane disposed perpendicular to the axis and beyond the lens relative to the direction of the light rays, and measuring the coordinates of points at which the light rays impinge on the analysis plane.

2. Method according to claim 1 comprising selectively masking the light rays so that a single light ray passes through the lens at a time.

3. Method according to claim 1, for determining the optical transmissibility of the lens, comprising generating an output signal responsive to photosensitive sensing of the position of a said light ray, the output signal being generated being proportional to the intensity of the impinging light ray.

4. Method according to claim 1, for determining the refractive index of the lens, comprising recovering the center light ray reflected from the lens, routing and detecting the reflected center light ray and generating an electrical signal related to the luminous intensity of the center light ray.

5. Apparatus for determining lens characteristics, in particular the focal power, comprising light emission means defining three light rays on a circle and another light ray along an axis through the center of the circle, said light emission means directing the light rays through the lens, a photosensitive position sensing means for measuring the coordinates of points of the light rays where they impinge on an analysis plane perpendicular to the axis, said photosensitive position sensing means being disposed beyond the lens relative to the direction of the light rays.

6. Apparatus according to claim 5 comprising a mask allowing a single one of the light rays to pass through the lens at a time.

7. Apparatus according to claim 5 wherein said photosensitive position sensing means generates electric current s in each of four directions in said analysis plane perpendicular to the axis, two of said directions being along an x axis and the other two of said directions being along a y axis.

8. Apparatus according to claim 6 wherein said photosensitive position sensing means generates electric currents in each of four directions being along an x axis and the other two of said directions being along a y axis.

9. Apparatus according to claim 5, for determining the optical transmissibility of the lens, wherein said photosensitive position sensing means supplies a signal proportional to the light intensity of the light rays impinging on said position sensing means.

10. Apparatus according to claim 5, for determining the refractive index of a lens, further comprising detector means disposed along the path of the light rays for supplying a signal related to the luminous intensity of the center light ray, and recovering means being disposed between the lens and said detector means for recovering the center light ray reflected from the lens and routing it to said detector means.

* * * * *